US012463735B2

(12) United States Patent
Madian et al.

(10) Patent No.: US 12,463,735 B2
(45) Date of Patent: Nov. 4, 2025

(54) SYSTEM AND METHOD FOR AUTONOMOUS THREE-DIMENSIONAL POSITION AND SIGNAL OPTIMIZATION OF USER EQUIPMENT IN TESTING ENVIRONMENTS

(71) Applicant: T-MOBILE INNOVATIONS LLC, Overland Park, KS (US)

(72) Inventors: Jacob Matthew Madian, Seattle, WA (US); Anthony Punzal Del Rosario, Sammamish, WA (US)

(73) Assignee: T-Mobile Innovations LLC, Overland Park, KS (US)

( * ) Notice: Subject to any disclaimer, the term of this patent is extended or adjusted under 35 U.S.C. 154(b) by 462 days.

(21) Appl. No.: 17/987,030

(22) Filed: Nov. 15, 2022

(65) Prior Publication Data

US 2024/0162994 A1  May 16, 2024

(51) Int. Cl.
*H04B 17/318* (2015.01)
(52) U.S. Cl.
CPC .................. *H04B 17/318* (2015.01)
(58) Field of Classification Search
CPC .................................................. H04B 17/318
See application file for complete search history.

(56) References Cited

U.S. PATENT DOCUMENTS

| | | | |
|---|---|---|---|
| 2013/0271317 A1* | 10/2013 | Goel | G01S 19/23 |
| | | | 342/357.62 |
| 2018/0337738 A1* | 11/2018 | Wen | H04B 17/309 |
| 2019/0115941 A1* | 4/2019 | Noda | H01Q 3/36 |
| 2021/0055337 A1* | 2/2021 | Kobayashi | G01R 29/0864 |
| 2021/0364563 A1* | 11/2021 | Endo | H04B 17/0087 |
| 2022/0236316 A1* | 7/2022 | Nakamura | H04B 17/21 |
| 2023/0121061 A1* | 4/2023 | Rowell | G01R 29/0878 |
| | | | 455/67.12 |
| 2023/0266383 A1* | 8/2023 | Meissner | G01R 31/3025 |
| | | | 324/750.03 |

* cited by examiner

*Primary Examiner* — Junpeng Chen
(74) *Attorney, Agent, or Firm* — SHOOK, HARDY & BACON L.L.P.; Elena McFarland (57) ABSTRACT

Aspects herein provides a system, method, and media for measuring real-time signal data of user equipment (UE) held by a 3D rotary stage device placed within a signal shielded box, into which signals are piped from an antenna. The signal data is analyzed using a gradient ascent algorithm. A microcontroller interprets and uses the algorithm's output generate motor commands that are communicated to the 3D rotary stage device to rotate the UE. Through this process, the UE is incrementally and interactively rotated in to optimize the signal data for subsequent UE testing, in an automated manner and without requiring human interaction or intervention.

20 Claims, 7 Drawing Sheets

SYSTEM AND METHOD FOR AUTONOMOUS THREE-DIMENSIONAL POSITION AND SIGNAL OPTIMIZATION OF USER EQUIPMENT IN TESTING ENVIRONMENTS

SUMMARY

A high-level overview of various aspects of the invention are provided here for that reason, to provide an overview of the disclosure and to introduce a selection of concepts that are further described below in the detailed description section. This summary is not intended to identify key features or essential features of the claimed subject matter, nor is it intended to be used as an aid in isolation to determine the scope of the claimed subject matter.

In brief and at a high level, this disclosure describes, among other things, methods, systems, and computer-readable media for running a computing software program that measures (e.g., via USB) real-time signal data from a user device, where that user device is physically held and/or manipulated in three dimensions by a rotary stage device. In embodiments, the rotary stage device is controlled by a microcontroller and used to calibrate and identify a physical position of a user device where the user device's signal receipt is optimized, for example, as a set up to subsequent testing of a user device.

In yet another aspect, a system is provided. The system includes a radio frequency shielded structure forming an interior volume and having a RF-shielding material forming a layer at least partially surrounding the interior volume. In embodiments, the system also includes a rotary stage device having one or more motors and configured to hold and manipulate a user device in three dimensions, with the rotary stage device located in the interior volume of the radio frequency shielded structure. The system includes an antenna that transmits radio frequencies for receipt by the user device held by the rotary stage device in the interior volume of the radio frequency shielded structure, in embodiments. In the system, a computing device receives signal data electronically output from the user device held by the rotary stage device located in the interior volume. A microcontroller in the system receives algorithm data electronically output from the computing device, and that generates instructions to cause the one or more motors of the rotary stage device to manipulate the user device in three dimensions.

In one aspect, a computerized method is provided. In accordance with the method, signal data is received that is associated with a plurality of positions of a user device, the signal data being electronically output from a user device held by a rotary stage device located in an interior volume of a radio frequency shielded structure. A gradient ascent algorithm is executed against the signal data to output a comparison of the signal data received for each of the plurality of positions of the user device. A microcontroller determines, based on the comparison output by the gradient ascent algorithm, relative signal quality between two or more of the plurality of positions of the user device. The microcontroller generates and communicates instructions for causing the rotary stage device to rotate the user device.

In another aspect, one or more non-transitory computer-readable media are provided for storing instructions that when executed via one or more processors perform a computerized method. Via one or more processors, and without user intervention, signal data is received that is associated with a plurality of positions of a user device, the signal data being electronically output from a user device held by a rotary stage device located in an interior volume of a radio frequency shielded structure. A gradient ascent algorithm is executed against the signal data to output a comparison of the signal data received for each of the plurality of positions of the user device. A microcontroller determines, based on the comparison output by the gradient ascent algorithm, relative signal quality between two or more of the plurality of positions of the user device. The microcontroller generates and communicates instructions for causing the rotary stage device to rotate the user device.

BRIEF DESCRIPTION OF THE DRAWINGS

Aspects are described in detail below with reference to the attached drawings figures, wherein.

DETAILED DESCRIPTION

The subject matter of the present invention is being described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Terms should not be interpreted as implying any particular order among or between various steps herein disclosed unless and except when the order of individual steps is explicitly described. As such, although the terms "step" and/or "block" may be used herein to connote different elements of the system and/or methods, the terms should not be interpreted as implying any particular order and/or dependencies among or between various components and/or steps herein disclosed unless and except when the order of individual steps is explicitly described. The present disclosure will now be described more fully herein with reference to the accompanying drawings, which may not be drawn to scale and which are not to be construed as limiting. Indeed, the present invention can be embodied in many different forms and should not be construed as limited to the embodiments set forth herein.

Throughout this disclosure, several acronyms and shorthand notations are used to aid the understanding of certain concepts pertaining to the associated system and services.

These acronyms and shorthand notations are intended to help provide an easy methodology of communicating the ideas expressed herein and are not meant to limit the scope of the present invention. The following is a list of these acronyms:

3G Third-Generation Wireless Access Technology
4G Fourth-Generation Wireless Access Technology
5G Fifth-Generation Wireless Access Technology
5GC Fifth-Generation Wireless Access Technology Core Network
CDMA Code Division Multiple Access
CD-ROM Compact Disk Read Only Memory
CU Central unit
DU Distribution unit
DVD Digital Versatile Disc
EEPROM Electrically Erasable Programmable Read-Only Memory
eMBB Enhanced Mobile Broadband
E-UTRAN Evolved Universal Mobile Telecommunications System
EVDO Evolution-Data Optimized
FD-MIMO Full Dimension Multiple-Input Multiple-Output
GIS Geographic/Geographical/Geospatial Information System
GPRS General Packet Radio Service
GSM Global System for Mobile Communications
iDEN Integrated Digital Enhanced Network
IIOT Industry Internet of Things
IOT Internet of Things
LAN Local Area Network
LED Light Emitting Diode
LTE Long Term Evolution
MAC Media Access Control
MD Mobile Device
MEC Mobile Far Edge Computer
MIMO Multiple-Input Multiple-Output
mMIMO Massive Multiple-Input Multiple-Output
mMTC Massive Machine Type Communication
mmWave Millimeter Wave
NAS Non-access Stratum
NEXRAD Next-Generation Radar
NR New Radio
PC Personal Computer
PCFICH Physical Control Format Indicator Channel
PCS Personal Communications Service
PDA Personal Digital Assistant
PDCCH Physical Downlink Control Channel
PDCP Packet Data Convergence Protocol
PDSCH Physical Downlink Shared Channel
PLMN Public Land Mobile Network
QoE Quality of Experience
QoS Quality of Service
RAM Random Access Memory
RAN Radio Access Network
RF Radio-Frequency
RLC Radio Link Control
ROM Read-Only Memory
RRC Radio Resource Control
RRU Remote Radio Unit
RSRP Reference Signal Received Power
RSRQ Reference Signal Received Quality
RSSI Received Signal Strength Indicator
RU Radio Unit
SON Self-Organizing Networks
TCP/IP Transmission Control Protocol/Internet Protocol
TDMA Time Division Multiple Access
TXRU Transceiver
UE User Equipment
UMTS Universal Mobile Telecommunications System
URLLC Ultra-Reliable Low Latency Communications
UTRAN Universal Terrestrial Radio Access Network
WAN Wide Area Network
WCD Wireless Communication Device (interchangeable with UE)
WLAN Wireless Local Area Network
XR Extended Reality Further, various technical terms are used throughout this description. An illustrative resource that fleshes out various aspects of these terms can be found in Newton's Telecom Dictionary, 25th Edition (2009).

Embodiments herein may be embodied as, among other things: a method, system, or set of instructions embodied on one or more computer-readable media. Computer-readable media includes both volatile and nonvolatile media, removable and non-removable media, and contemplate media readable by a database, a switch, and various other network devices. Computer-readable media includes media implemented in any way for storing information. Examples of stored information include computer-useable instructions, data structures, program modules, and other data representations. Media examples include RAM, ROM, EEPROM, flash memory or other memory technology, CD-ROM, DVD, holographic media or other optical disc storage, magnetic cassettes, magnetic tape, magnetic disk storage, and other magnetic storage devices. These technologies can store data momentarily, temporarily, or permanently. Embodiments may take the form of a hardware embodiment, or an embodiment combining software and hardware. Some embodiments may take the form of a computer program product that includes computer-useable or computer-executable instructions embodied on one or more computer-readable media.

"Computer-readable media" can be any available media and may include volatile and nonvolatile media, as well as removable and non-removable media. By way of example, and not limitation, computer-readable media may include computer storage media and communication media.

"Computer storage media" may include, without limitation, volatile and non-volatile media, as well as removable and non-removable media, implemented in any method or technology for storage of information, such as computer-readable instructions, data structures, program modules, or other data. In this regard, computer storage media may include, but is not limited to, RAM, ROM, EEPROM, flash memory or other memory technology, CD-ROM, DVDs or other optical disk storage, magnetic cassettes, magnetic tape, magnetic disk storage, or other magnetic storage device, or any other medium which can be used to store the desired information and which may be accessed by the computing device 500 shown in FIG. 5.

"Communication media" may include, without limitation, computer-readable instructions, data structures, program modules, or other data in a modulated data signal, such as a carrier wave or other transport mechanism, and may include any information delivery media. As used herein, the term "modulated data signal" refers to a signal that has one or more of its attributes set or changed in such a manner as to encode information in the signal. By way of example, and not limitation, communication media includes wired media such as a wired network or direct-wired connection, and wireless media such as acoustic, radio frequency (RF), infrared, and other wireless media. Combinations of any of the above may also be included within the scope of computer-readable media.

"Network" refers to a network comprised of wireless and wired components that provide wireless communications service coverage to one or more UE. For example, the network may include one or more, or a plurality of, wireless networks, hardwired networks, telecommunication networks, peer-to-peer networks, distributed networks, and/or any combination thereof. The network may comprise one or more base stations, one or more cell sites (i.e., managed by a base station), one or more cell towers (i.e., having an antenna) associated with each base station or cell site, a gateway, a backhaul server that connects two or more base stations, a database, a power supply, sensors, and other components not discussed herein, in various embodiments. Examples of a network include a telecommunication network (e.g., 3G, 4G, 5G, CDMA, CDMA 1XA, GPRS, EVDO, TDMA, GSM, LTE, and/or LTE Advanced). Additional examples of a network include a WAN, WLAN, LAN, a metropolitan area network (MAN), a personal area network (PAN), a campus-wide network (CAN), a storage area network (SAN), a virtual private network (VPN), an enterprise private network (EPN), a home area network (HAN), a Wi-Fi network, a Worldwide Interoperability for Microwave Access (WiMax) network, and/or an ad-hoc ("mesh") network. The network may include or may communicate with a physical location component for determining a geographic location of an item, package, parcel, personnel, vehicle, end-point location, etc., by leveraging, for example, a Global Positioning System (GPS), Globalnaya Navigazionnaya Sputnikovaya Sistema (GLONASS), BeiDou Navigation Satellite System (BDS), Global Navigation Satellite System (GNSS or "Galileo"), an indoor position system (IPS), or other positioning systems that leverage non-GPS signals or networks (e.g., signals of opportunity (SOP)).

"Base station" and "cell site" may be used interchangeably herein to refer to a defined wireless communications coverage area (i.e., a geographic area) serviced by a base station. It will be understood that one base station may control one cell site or, alternatively, one base station may control multiple cell sites. As discussed herein, a base station is deployed in the network to control and facilitate, via one or more antenna arrays, the broadcast, transmission, synchronization, and receipt of one or more wireless signals in order to communicate with, verify, authenticate, and provide wireless communications service coverage to one or more UE that request to join and/or are connected to a network.

"Access point" may refer to hardware, software, devices, or other components at a base station, cell site, and/or cell tower having an antenna, an antenna array, a radio, a transceiver, and/or a controller. Generally, an access point may communicate directly with user equipment according to one or more access technologies (e.g., 3G, 4G, LTE, 5G, mMIMO) as discussed hereinafter. Access point refers to a device with complex software that is specifically configured to provide one or more user devices with a connection and/or access to a wireless network using, for example, an antenna, an antenna array, and/or one or more antenna elements. Examples of an access point include a cell tower, a cell site, a base station, a NodeB, an eNodeB, a gNodeB, a macro cell, a micro cell, a femtocell, a picocell, and/or a computing device capable of acting as a wireless "hotspot." The terms "access point," "cell site," "site," "base station," and "cell tower" are used interchangeably for simplicity and thus the terms should not be construed as limiting with regard to one another unless expressly designated as such in this Detailed Description. Examples of a cell site include macro cells such as a cell tower controlled by a gNodeB, as well as small cells, such as a femtocell or picocell. Accordingly, the scale and coverage area of an access point is not limited to the examples discussed, and any size and shape of coverage area is contemplated to be within the scope of the invention. Because a cell tower and a base station controlling the cell tower may be remote from one another, or alternatively may be localized to each other, the term access point is not intended to be so limited as to require a cell tower and/or antenna. Generally, an access point, as discussed herein, is intended to refer to any device, whether local or remote to a physical location of a cell tower and/or antenna, having complex software that is specifically configured to provide one or more user devices with a connection and/or access to a wireless network.

"User equipment," "UE," "mobile device," "user device," and "wireless communication device" are used interchangeably to refer to a device employed by an end-user that communicates using a network. UE generally includes one or more antenna coupled to a radio for exchanging (e.g., transmitting and receiving) transmissions with a nearby base station, via an antenna array of the base station. In embodiments, UE may take on any variety of devices, such as a personal computer, a laptop computer, a tablet, a netbook, a mobile phone, a smartphone, a personal digital assistant, a wearable device, a fitness tracker, or any other device capable of communicating using one or more resources of the network. UE may include components such as software and hardware, a processor, a memory, a display component, a power supply or power source, a speaker, a touch-input component, a keyboard, and the like. In embodiments, some of the UE discussed herein may include current UE capable of using 5G and having backward compatibility with prior access technologies, current UE capable of using 5G and lacking backward compatibility with prior access technologies, and legacy UE that is not capable of using 5G.

The terms "radio," "controller," "antenna," and "antenna array" are used interchangeably to refer to one or more software and hardware components that facilitate sending and receiving wireless radio-frequency signals, for example, based on instructions from a base station. A radio may be used to initiate and generate information that is then sent out through the antenna array, for example, where the radio and antenna array may be connected by one or more physical paths. Generally, an antenna array comprises a plurality of individual antenna elements. The antennas discussed herein may be dipole antennas, having a length, for example, of ¼, ½, 1, or 1½ wavelength. The antennas may be monopole, loop, parabolic, traveling-wave, aperture, yagi-uda, conical spiral, helical, conical, radomes, horn, and/or apertures, or any combination thereof. The antennas may be capable of sending and receiving transmission via FD-MIMO, mMIMO, 3G, 4G, 5G, and/or 802.11 protocols and techniques.

"Test box," "Radio Frequency (RF) box/structure," and "RF shielded box/structure" and the like are used interchangeably herein to refer to a physical structure having or forming an enclosed interior volume, wherein the physical structure includes one or more magnetic and/or conductive materials or compositions (e.g., integrated and/or layered) that reduce, stop, and/or otherwise prevent exteriorly-located electromagnetic and/or RF signals from penetrating into the enclosed interior volume. Examples of shielding materials can include metallic strips, foams, and/or screens comprised of copper, steel, and/or aluminum. Further, the RF shielded test box may include one or more apertures or entry points of any shape or size through which electromagnetic and/or RF signals can be purposefully transmitted, thereby controlling the entry of said signals into the enclosed interior volume, for example, for the purposes of testing UE that can be placed into the enclosed interior volume. The RF shielded test box may be constructed in various manners to be any size or shape compatible with the environments, methods, and systems discussed herein for three-dimensional position calibration and signal optimization of any RF-receiving device.

"Rotary stage device," "Stage device," "3D rotary stage," "3D rotational apparatus," and the like are used interchangeably herein to refer to an apparatus that is configured to hold another device or component while manipulating said device across multiple axis in space (i.e., three dimensional rotation using two or more axis). Examples of multi-axial rotary stages may operate to rotate using three axis, or two axis. Examples of multi-axial rotary stages may operate using goniometric positioning.

"Signal data" refers to digitally encoded information regarding a user device's receipt of signals and/or the user device's processing and performance. Signal data can include, for example, Layer 1 messages (e.g., PDCCH, PCFICH, PDSCH), Layer 2 messages (e.g., MAC, RLC, PDCP), Layer 3 messages (e.g., RRC, NAS), TCP/IP packet information, QoS measurements, QoE measurements, RSSI measurements, RSRP measurements, RSRQ measurements, and the like.

Additionally, it will be understood that sequential or relative terms such as "first," "second," and "third" are used herein for the purposes of clarity in distinguishing between elements or features, but the terms are not used herein to import, imply, or otherwise limit the relevance, importance, quantity, technological functions, physical or temporal sequence, physical or temporal order, and/or operations of any element or feature unless specifically and explicitly stated as such.

At a high level, embodiments discussed herein provide a system, method, and media for running a computing software program that measures (e.g., via USB) real-time signal data from a user device, where that user device is physically held and/or manipulated in three dimensions by a rotary stage device. In embodiments, the rotary stage device is controlled by a microcontroller and used to calibrate and identify a physical position of a user device where the user device's signal receipt is optimized, for example, as a set up to subsequent testing of a user device.

The rotary stage device is positioned within a physical signal-shielded structure, such as a radio frequency shielded "test box," into which signals are transmitted from an externally-located antenna, such as a macro cell, small cell, or micro cell antenna. The signal data (e.g., PDSCH) that is captured in real-time from the user equipment are communicated to a computing device using a hard wired connection that links the user equipment to the computing device, for example, via the signal-shielded structure. For example, a computer application or computer program may receive, request, or otherwise obtain the signal data, such as XCAL. The signal data includes signal measurements taken/obtained by the user device in the signal shielded structure when receiving signals (e.g., radio frequencies) transmitted by the antenna and piped into the signal shielded structure. For example, a microcontroller can send instructions to the rotary stage device to rotate, move, or manipulate the user device by a particular quantity of degrees in one direction (e.g., tilt user device left or tilt user device up relative to current position) and then the microcontroller can send instructions to the rotary stage device to rotate, move, or manipulate the user device by a particular quantity of degrees in an opposing direction (e.g., tilt user device right or tilt user device down relative to current position). The signal data includes signal strength and/or signal quality metrics that that are measured or obtained when/while the user device is rotated or tilted in one direction and signal strength and/or signal quality metrics that that are measured or obtained when/while the user device is rotated or tilted in the other direction, which may be an opposing direction. The signal data can, in some embodiments, include signal strength and/or signal quality metrics measured for each of two or more distinct positions of the user device, such that the signal strength and quality experienced by the user device in each position can be measured and compared as further discussed herein. The quantity of degrees rotation can, in embodiments be relatively small (e.g., one degree to ten degrees) to the 360 degrees available, such that the user device is rotated slightly right, then slight left, in order to compare the signal experience, as further described below. As used herein, "signal strength" and "signal power" can refer to various wireless connection quality metrics or measurements, such as PDSCH throughput, RSRP, RSRQ, and more, as further discussed hereinafter.

For the sake of brevity and clear explanation, the rotation in one direction or another are discussed as left, right, up, down, and the like, although it will be understood that the physical position of the user device can be described in detailed terms using three dimensional coordinates relative to multiple axis of rotation, such as an x-axis, y-axis, and z-axis as held by the rotary stage device. For example, the rotary stage device may be capable of rotating the user device in 360 degrees around an x-axis (e.g., horizontal axis or first dimension), may be capable of rotating the user device in 360 degrees around a y-axis (e.g., vertical axis or second dimension), and/or may be capable of rotating the user device in 360 degrees around a z-axis (e.g., depth axis or third dimension).

Continuing, the computing device and/or an application running at the computing device may provide the signal data to a gradient ascent algorithm or a similar algorithm for ingestion and machine-learning analysis. The gradient ascent algorithm (or similar) performs an iterative optimization by determining a local maximum ("ascent") value at each step/cycle, moving toward a local maximum for each sequential step/cycle, and thus, the iterative optimization moves or "climbs" in an ascending manner along a gradient towards a maximum over a quantity of steps/cycles. In embodiments, the gradient ascent algorithm compares the signal strength and quality experienced by the user device in each of two or more positions, and selects the position having the stronger or best signal strength and quality relative to the other positions for which measurements were obtained. As such, the gradient ascent algorithm can output that the signal strength and quality is stronger or better when the user device is tilted or rotated to the right, relative to when the user device is tilted or rotated to the left.

The gradient ascent algorithm's output (e.g., an indication specifying that the user device's signal receipt metric(s) are better in one position relative to one or more other positions) is communicated to a microcontroller that is programmed to control and provide instructions to the rotary stage device. The microcontroller interprets the output and converts this information into instructions that cause one or more motors of the rotary stage to tilt or rotate the user device toward a particular direction associated with the relatively improved signal receipt metric(s) or into a particular reposition associated with the relatively improved signal receipt metric(s). For example, based on the gradient ascent algorithm's output indicating that the user device's signal receipt metric(s) improve in signal and/or quality when the user device is rotated six degrees to the right relative to when the user device is rotated six degrees to the left, the microcontroller can generate instructions that cause one or more motors of the rotary stage device to tilt or rotate the user device six degrees to the right (i.e., away from the left direction that is associated with lesser signal receipt metric(s)).

This process of incrementally rotating the user device in various directions, obtaining signal measurements for those positions, determining the strongest signal receipt among the positions, rotating the user device toward or into the position having the strongest signal receipt, and then repeating this process through multiple cycles (in order to incrementally evaluate the user device's signal receipt for each of hundreds or thousands of positions), continues until the signal receipt measurements for the user device approaches, meets, or is within a defined range of a predefined target throughput for the signal strength and/or quality. Additionally or alternatively, optimization of positioning is determined to occur when all positional changes result in a decrease in the received signal strength (i.e., indicating that this position is optimized as all further positional changes (e.g., in various directions) would degrade or reduce signal strength relative to this position).

When the predefined target throughput is met, an optimization notification can be provided to the computing device and the user device can be held in that final position associated with having a signal receipt measurement that corresponds to the predefined target throughput. The predefined target throughput can be, in some embodiments, a theoretical or hypothetical maximum throughput calculated based on the specific model and make of the user device (and any components thereof), and/or based on the make, model, and power of the externally-located antenna from which radio frequencies are being piped into the signal-shielded structure. The theoretical or hypothetical maximum throughput is further dependent upon the signal frequency (e.g., the 2.5 GHz frequency has a higher maximum theoretical throughput than a 600 MHZ frequency) being provided by the antenna, as will be understood by the skilled artisan.

Once the user device is thus positioned within the signal-shielded structure such that the signal receipt metrics of the user device meet the predefined target throughput for the signal strength and/or quality, the user device's position and signal receipt are optimized within the testing environment of the signal-shielded structure. At that time, one or more other performance tests for the user device can be executed as the user device is optimally positioned within the signal-shielded structure. As such, the system, method, and media discussed herein provide a computing software program that autonomously determines and implements a three-dimensional position of a user device for signal optimization within a testing environment, all without human intervention or manual actions. The embodiments herein provide a "set it and forget it" approach whereby a user device's signal receipt strength and quality is optimized using autonomous positioning, machine-learning algorithm(s), repositioning, and re-evaluations, through the methods, media, and system discussed herein.

Figure 1:
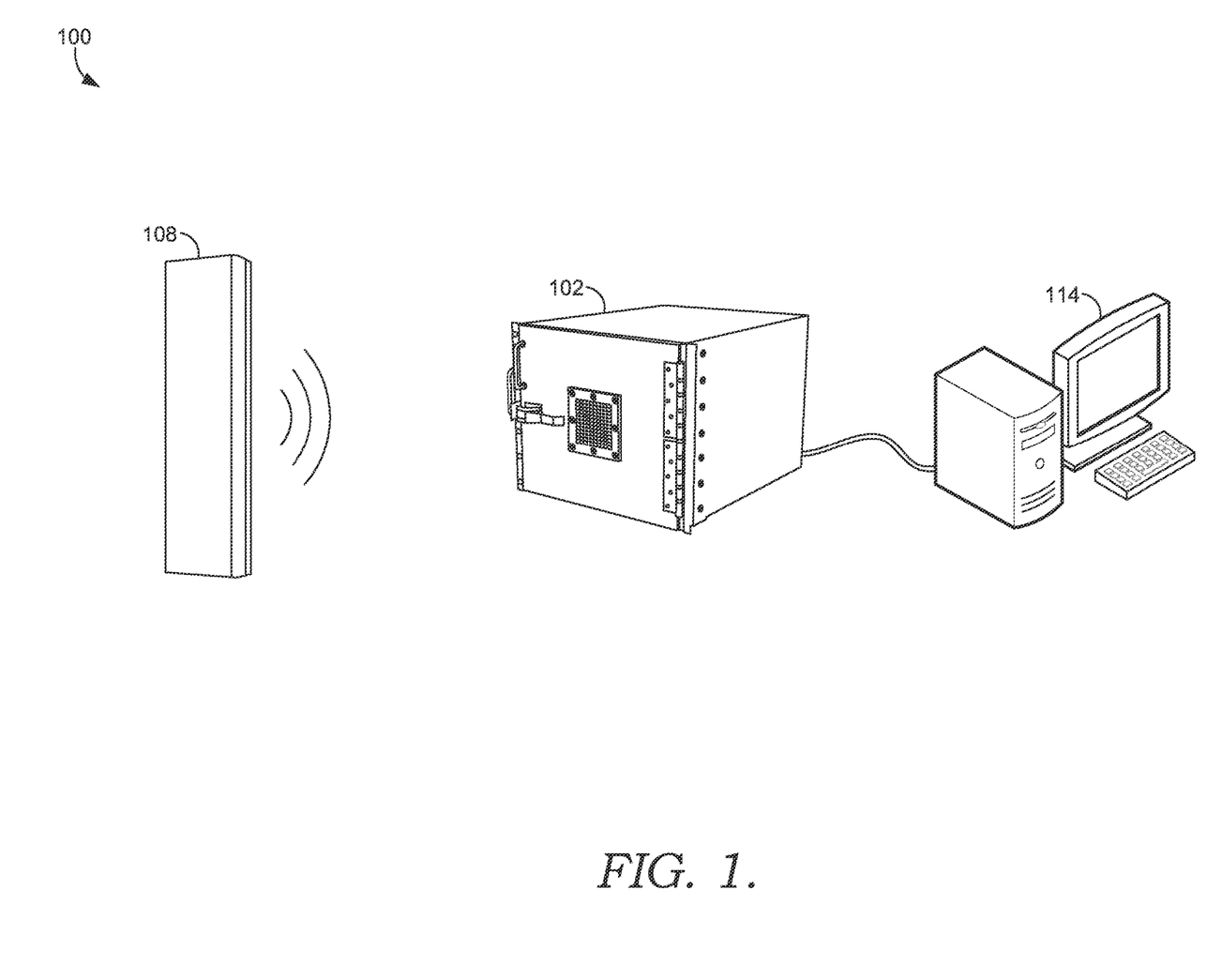
FIG. 1 depicts a system in accordance with one or more embodiments.
Figure 2:
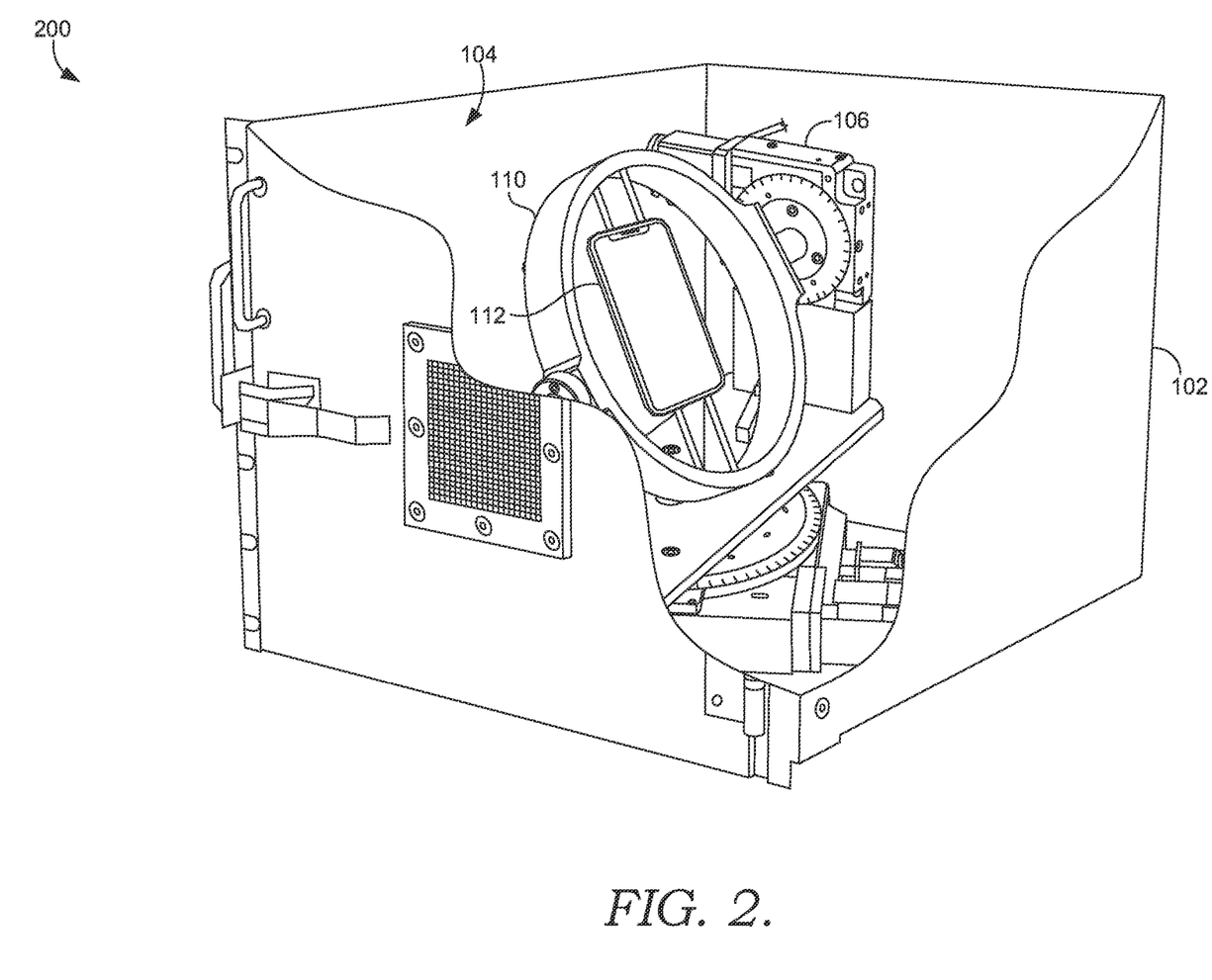
FIG. 2 depicts a rotary stage device in the interior volume of the signal-shielded structure of the system of FIG. 1, in accordance with one or more embodiments.
Figure 3A:
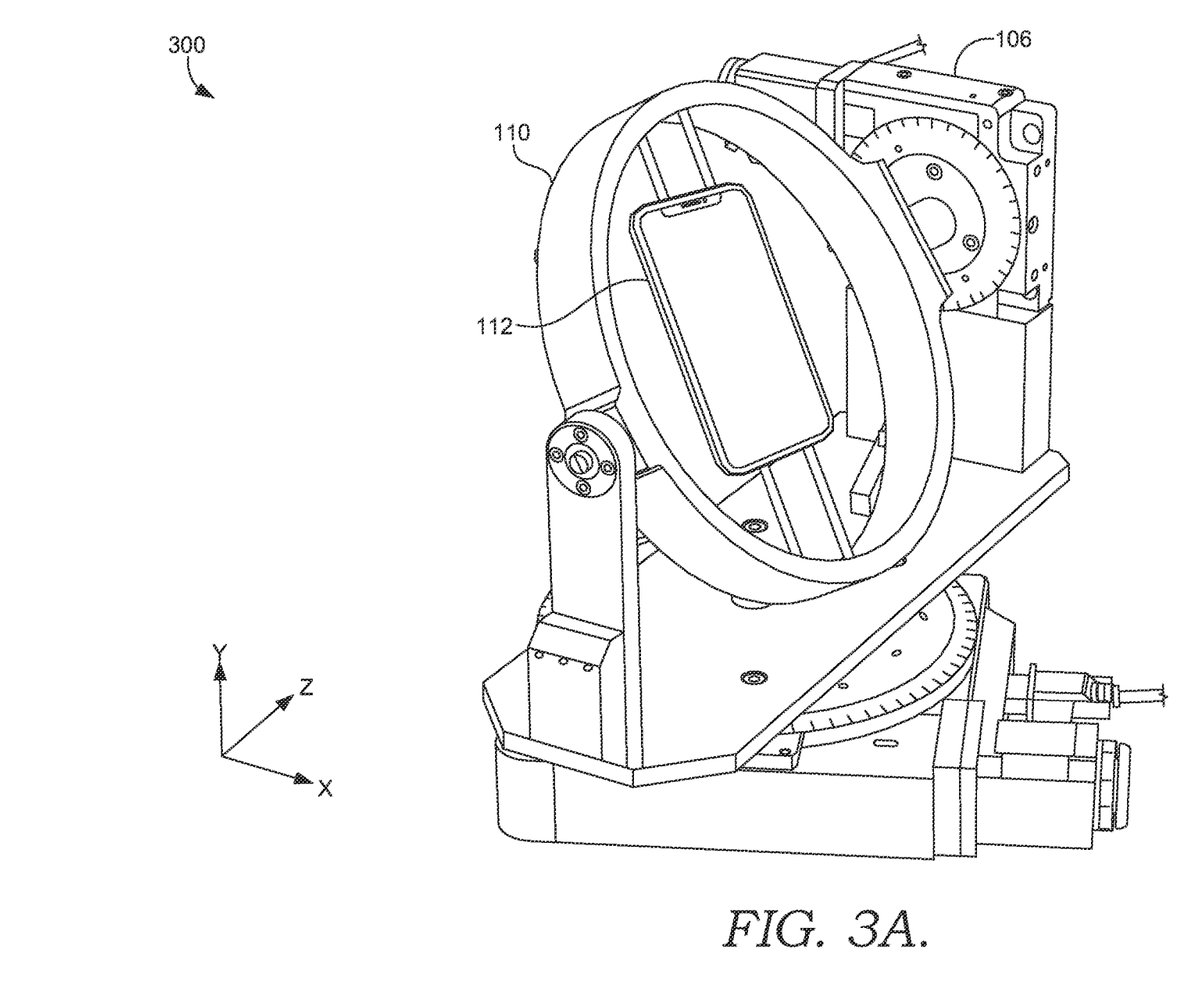
FIG. 3A depicts an example rotary stage device configured to hold and manipulate a user device, as held in an initial position, in accordance with one or more embodiments.
Figure 3B:
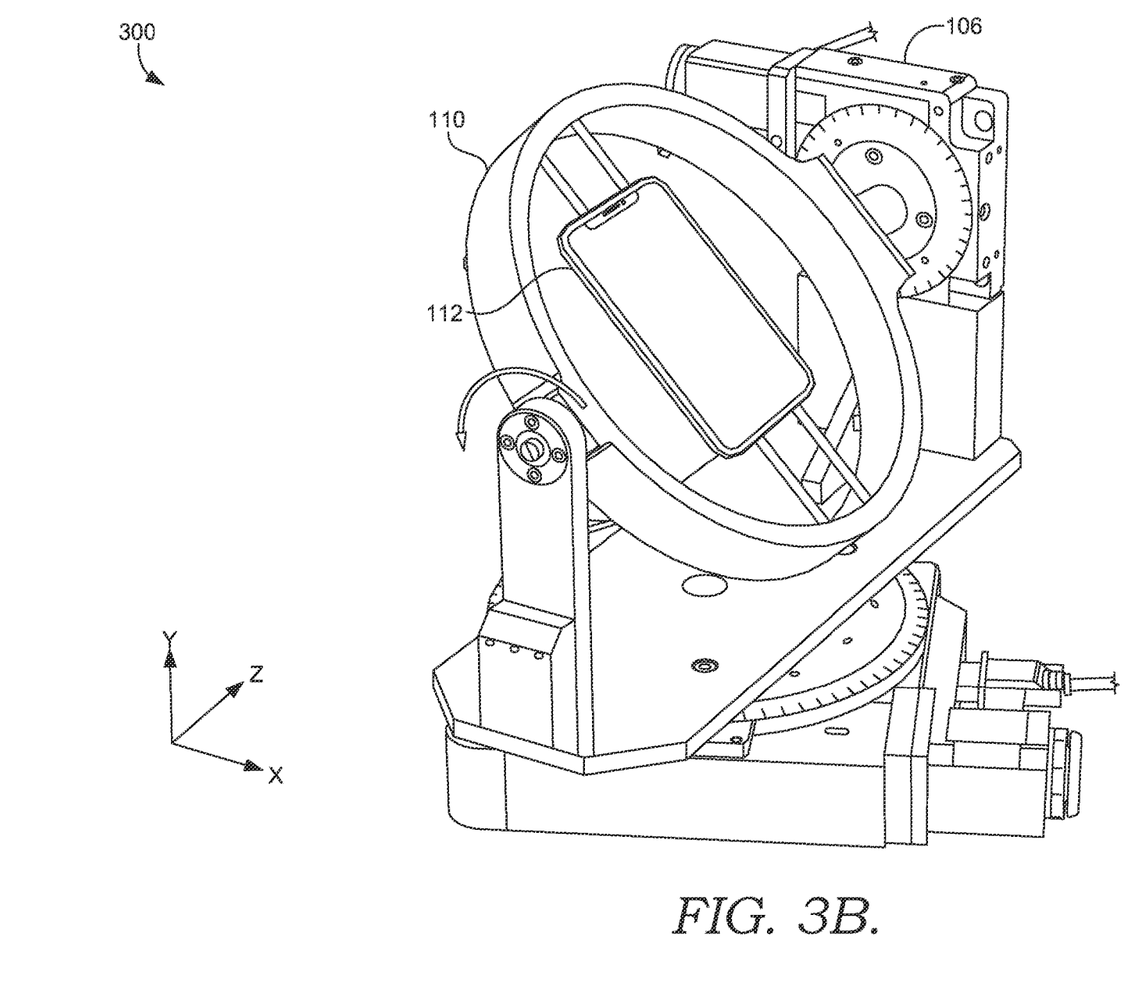
FIG. 3B depicts the example rotary stage device configured to hold and manipulate the user device, as held in a first position after rotation, in accordance with one or more embodiments.
Figure 3C:
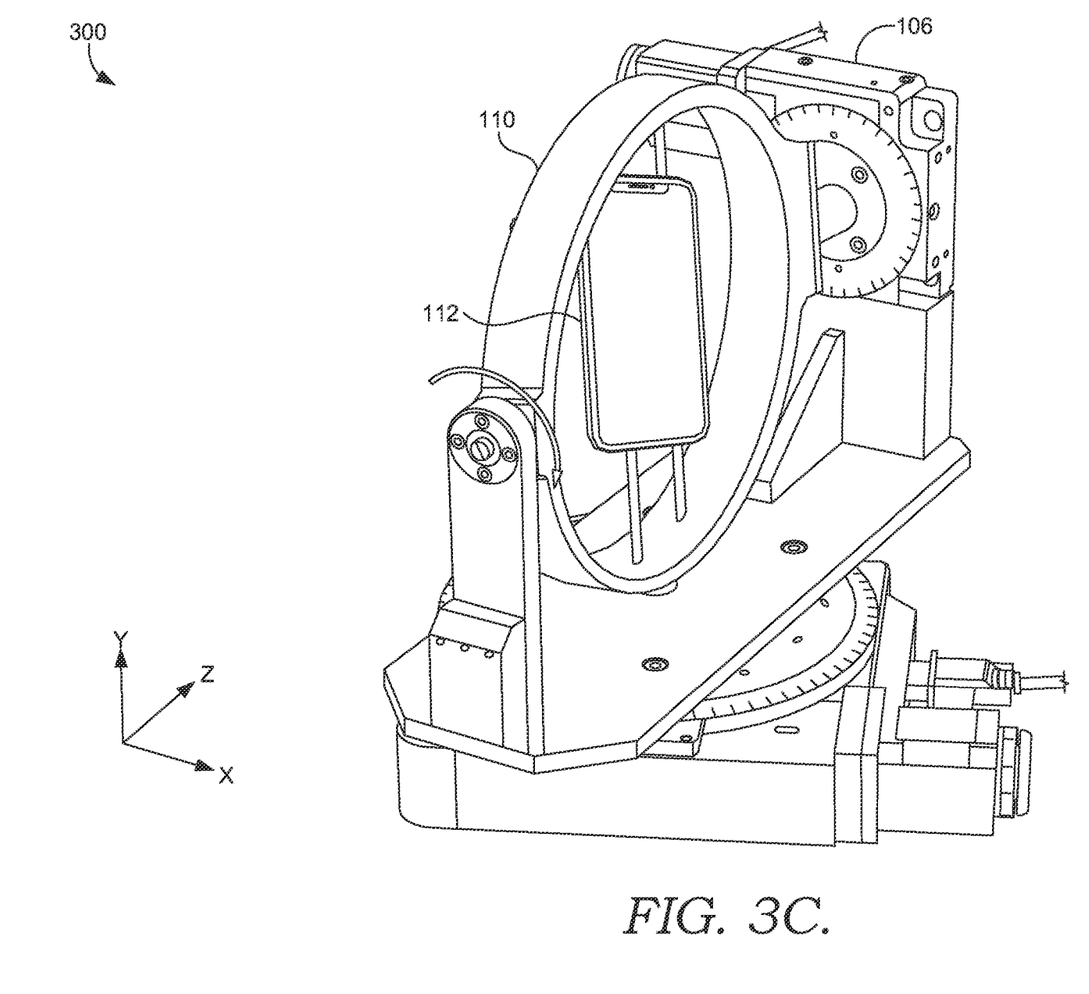
FIG. 3C depicts the example rotary stage device configured to hold and manipulate the user device, as held in a second position after another rotation, in accordance with one or more embodiments.

Beginning with FIGS. 1 to 3, as system 100 is provided for autonomously "calibrating" a user device's physical position within a signal-shield structure using a rotary stage device controlled by a microcontroller, so that the user device's signal receipt is optimized for one or more subsequent performance tests. In embodiments, the system 100 includes a radio frequency shielded structure 102 forming an interior volume 104 and having a RF-shielding material forming a layer (not pictured) at least partially surrounding the interior volume 104. The radio frequency shielded structure 102 includes an aperture 106 or port, in various embodiments, through which an external signal may pass from the exterior of the radio frequency shielded structure 102, and which can be shaped and/or sized in order to control the passage of radio frequency shielded structure 102 from the exterior of the radio frequency shielded structure 102 and into the interior volume 104. Accordingly, in embodiments, the system 100 includes an antenna 108 that transmits signals, such as one or more radio frequencies, which are transmitted and pass through the aperture 106, from the exterior of the radio frequency shielded structure 102 and into the interior volume 104. As such, signals transmitted by the antenna 108 are "piped" from the exterior of the radio frequency shielded structure 102 into the interior volume 104.

The system 100 further incudes a rotary stage device 110 located in the interior volume 104 of the radio frequency shielded structure 102, as shown in FIG. 2. The rotary stage device 110 includes one or more motors that can be used to manipulate and rotate an object, such as user device 112, in various directions or along multiple axis. As such, the rotary stage device 110 is configured to securely hold the user device 112 and to tilt or rotate the user device 112 in three dimensions of space. When signals transmitted by the antenna 108 pass into the interior volume 104 via the aperture 106, the user device 112 can receive and process the signals received by the user device 112 within the interior volume 104 of the radio frequency shielded structure 102. The signals received and processed by the user device 112 can be recorded and/or reported as signal data to other components or devices in the system 100 using wired connections and/or wireless transmissions. For example, a hardwired cable (e.g., Universal Serial Bus (USB) such as USB-C, micro-USB, and the like) or other physical connection may be used to transmit the signal data from the user device 112 to other components or devices in the system 100. Such hardwired connections may connect the user device 112 to the rotary stage device 110 and/or the radio frequency shielded structure 102, which may further push or communicate the signal data to other components or devices in the system 100, either automatically or responsive to a request (e.g., "pulled") by one or more computer applications.

For example, the system 100 of FIG. 1 includes a computing device 114 that receives the signal data electronically output from the user device 112, in real-time or near real-time, as the user device 112 is held by the rotary stage device 110 located in the interior volume 104. The computing device 114 receives or pulls the signal data, for example, using a computer application such as XCAL computer program product(s) by Accuver®. The computing device 114 can further include a gradient ascent algorithm that can be executed against the signal data, in near real-time or real-time with the receipt of the signal data by the computing device 114. It will further be understood that, in some embodiments, the gradient ascent algorithm can be executed by a microcontroller (not shown).

As such, in embodiments, the computing device 114 further includes a microcontroller (not shown) that receives output from the gradient ascent algorithm, referred to as "algorithm data" for simplicity. Although the microcontroller is discussed in terms of being included with the computing device 114, it will be understood that the microcontroller may also be separate from or independent of the computing device 114, in some configurations. Based on the algorithm data, the microcontroller generates and electronically communicates machine-readable instructions to the rotary stage device 110 that automatically cause one or more motors of the rotary stage device 110 to manipulate the user device in three dimensions. As such, the microcontroller executes a gradient ascent algorithm against the signal data received from the computing device in near real-time and utilizes the algorithm data to generate the instructions that cause the one or more motors of the rotary stage device 110 to manipulate the user device in three dimensions.

For example, in an embodiment, the gradient ascent algorithm compares signal receipt measurements of the user device 112 in the signal data. The signal receipt measurements correspond to measurements obtained when the user device 112 receives radio frequencies transmitted from the antenna 108 while the user device 112 is held in each of a plurality of positions by the rotary stage device 110. Then, algorithm data is generated from that comparison and output by the gradient ascent algorithm. The algorithm data indicates that a signal strength of the user device 112 when in a first position of the plurality of positions is greater than a signal strength when the user device 112 is in a second position of the plurality of positions, in this example. Then, in such an example, the microcontroller determines, based on the algorithm data, to generate and communicate a first set of instructions that cause the rotary stage device 110 to rotate the user device 112 by a first defined quantity of degrees in a first direction relative to a first axis.

FIG. 3A depicts an example of the user device 112 being held by the rotary stage device 110 in an initial position. FIG. 3B depicts when the user device 112 is rotated into a first position by tilting the user device 112 to the left (shown as rotating the user device 112 downward and left toward the horizontal x-axis), and corresponding signal data for the first position is captured. FIG. 3C depicts when the user device 112 is rotated into a second position to the right (shown as rotating the user device upward and right toward the vertical y-axis) and corresponding signal data for the second position is captured. The gradient ascent algorithm then compares the signal receipt measurements in the signal data and outputs algorithm data. In this example, the algorithm data indicates that a signal strength of the user device 112 when in the first position (FIG. 3B) of the plurality of positions is greater than a signal strength when the user device 112 is in a second position (FIG. 3C) of the plurality of positions. Thus, the microcontroller utilizes this information to generate instructions and to cause the rotary stage device 110 to activate motors that rotate the user device 112 by a first defined quantity of degrees, as determined by the microcontroller, in the first direction relative to a first axis to position the user device 112 in the first position (i.e., by tilting the user device 112 to the left which is shown as rotating the user device 112 downward and left toward the horizontal x-axis). It will be understood that the signal data that is captured for comparison of signal metrics may include two positions (e.g., left and right), three positions (e.g., tilt left, tilt right, tilt up), four positions (e.g., tilt left, tilt right, tilt up, tilt down), or more, in various embodiments. The directions of rotation or tilt may be opposing, or may be the same, but differ by degree (e.g., tilt right six degrees from origin position, tilt right twelve degrees from origin position), in various embodiments. In various embodiments, the quantity of positions analyzed by the algorithm at each cycle may vary between cycles, may stay the same for every cycle (e.g., every cycle compares two positions), may increase with one or more subsequent cycles, or may decrease with one or more subsequent cycles, or the like, as the predefined throughput value is approached and/or as the difference between the signal strength values for distinct positions being compared decreases.

Continuing with the example(s), additional algorithm data can be output by the gradient ascent algorithm to indicate that a signal strength of the user device when in a third position of the plurality of positions is greater than a signal strength when the user device is in a fourth position of the plurality of positions, based on further rotations and signal data capture. In the example(s), the microcontroller determines, based on the additional algorithm data, to generate and communicate a second set of instructions that cause the rotary stage device to rotate the user device by a second defined quantity of degrees in a second direction relative to a second axis.

Having described the system 100 and components thereof, it will be understood by those of ordinary skill in the art that system 100 is but one example of a suitable system and is not intended to limit the scope of use or functionality of the present invention. Similarly, system 100 should not be interpreted as imputing any dependency and/or any requirements with regard to each component and combination(s) of components illustrated in FIGS. 1 and 2. It will be appreciated by those of ordinary skill in the art that the location of components illustrated in FIGS. 1 and 2 is an example, as other methods, hardware, software, components, and devices for establishing communication links between the components shown in FIGS. 1 and 2, may be utilized in various implementations of the present invention. It will be understood to those of ordinary skill in the art that the components may be connected in various manners, hard-wired or wireless, and may use intermediary components that have been omitted or not included in FIGS. 1 and 2 for simplicity's sake. As such, the absence of components from FIGS. 1 and 2 should be not be interpreted as limiting the present invention to exclude additional components and combination(s) of components. Moreover, though components are represented in FIGS. 1 and 2 as singular components, it will be appreciated that some embodiments may include a plurality of devices and/or components such that FIGS. 1 and 2 should not be considered as limiting the number of a device or component.

Figure 4:
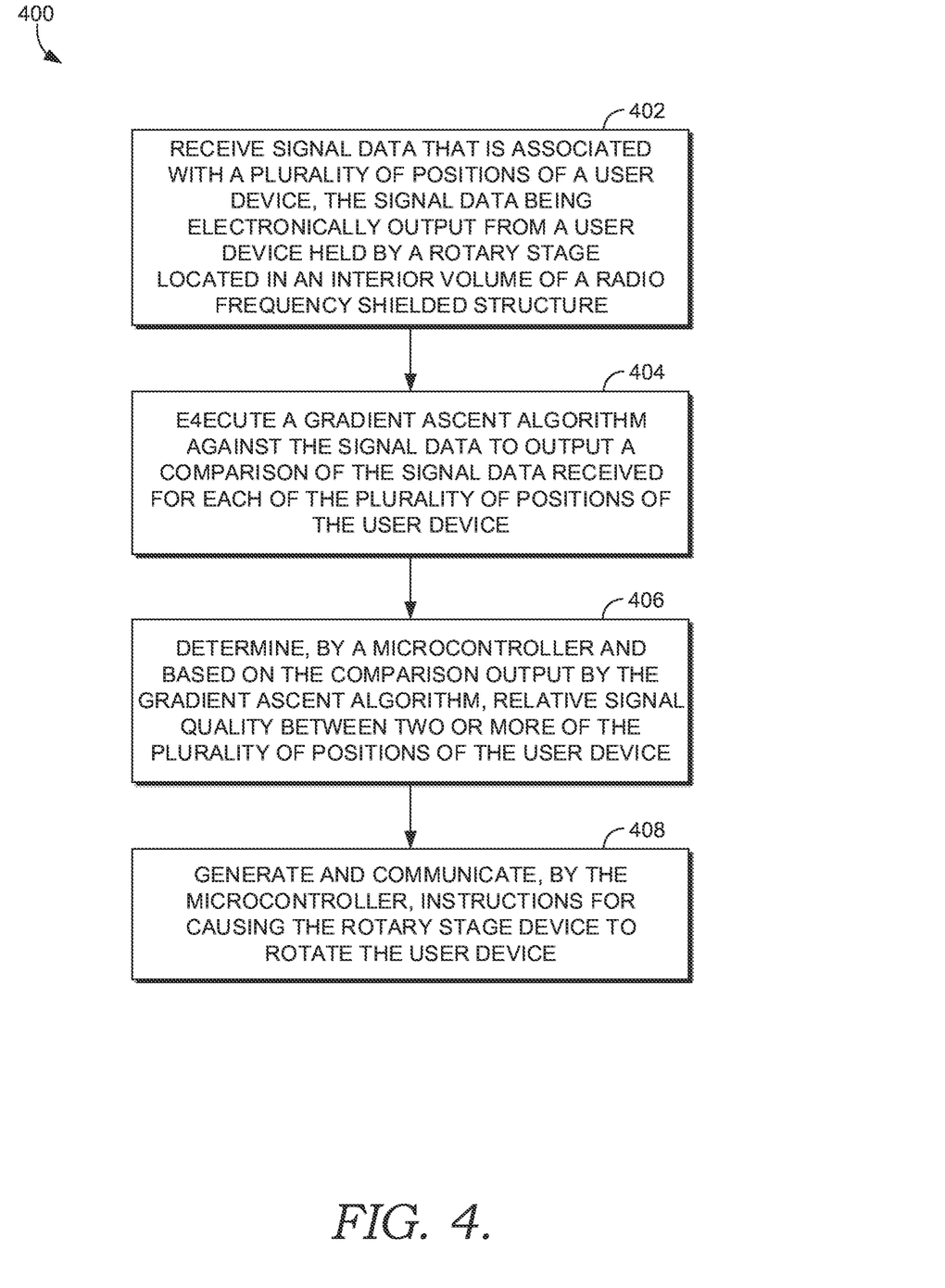
FIG. 4 depicts a flowchart of an example method in accordance with one or more embodiments.

Turning now to FIG. 4, a method 400 is discussed that can be performed via one or more of the components and component interactions previously described in FIGS. 1 and 2. As such, the method is discussed briefly for brevity, though it will be understood that the previous discussion and details described therein can be applicable to aspects of the method 400 of FIG. 4. Additionally or alternatively, it will be understood that the method 400 discussed herein can be implemented or performed via the execution of computer-readable instructions stored on computer readable media, by one or more processors. The method 400 discussed hereinafter may be computer-implemented methods. In embodiments, one or more non-transitory computer-readable storage medium having computer-executable/computer-readable instructions that are utilized to perform the method 400.

At block 402, signal data that is associated with a plurality of positions of a user device is received, the signal data being electronically output from a user device held by a rotary stage device located in an interior volume of a radio frequency shielded structure. For example, an XCAL application running on a computing device can receive or retrieve "live" real-time signal data from the user device where that data includes PDSCH throughput values that correspond to data transfer speed measured between the antenna and the user device which the user device is located while located at two or more distinct positions within a signal-shielded structure. At block 404, a gradient ascent algorithm is executed against the signal data to output a comparison of the signal data received for each of the plurality of positions of the user device. For example, the gradient ascent algorithm can ingest PDSCH throughput values and compare the PDSCH information associated with each position relative to each other. At block 406, a microcontroller determines, based on the comparison output by the gradient ascent algorithm, relative signal quality between two or more of the plurality of positions of the user device. The microcontroller, by way of the algorithm, can identify or rank one of the positions that has a corresponding PDSCH throughput value that is the highest or greatest relative to the other/remaining positions for which PDSCH throughput values were received. The microcontroller, by way of the algorithm, can identify the one position having the highest/greatest PDSCH throughput value relative to the other position(s), and can used this position information (e.g., coordinates) in subsequent tasks. At block 408, the microcontroller generates and communicates instructions for causing the rotary stage device to rotate the user device. For example, the instruction can specify to rotate or tilt the user device to be physically in the one position having the highest/greatest PDSCH throughput value relative to the other position(s). Thus, the user device is rotated to align and/or to have a position that corresponds to an improved/increased signal strength and/or quality relative to the other positions represented in the signal data, based on the a comparison of the signal data received for each of the plurality of positions of the user device. The process can then be repeated iteratively to evaluate the PDSCH throughput values of various positions and to continually rotate or tilt the user device into position(s) that have an ever increasing or greater PDSCH throughput value, in embodiments.

In further embodiments, the microcontroller causes one or more motors of the rotary stage device to rotate the user device toward a first direction and a first signal strength is measured when the user device has been rotated toward the first direction, which is captured in signal data received by the computing device. In the embodiment, the microcontroller causes the one or more motors of the rotary stage device to rotate the user device toward a second direction and a second signal strength is measured when the user device has been rotated toward the second direction, which is captured in signal data received by the computing device. Then, the gradient ascent algorithm determined whether the first signal strength is greater than the second signal strength. When the first signal strength is greater than the second signal strength, the gradient ascent algorithm generates algorithm data that indicates the first signal strength is greater than the second signal strength, which is provided to the microcontroller. Based on the determination output by the gradient ascent algorithm, the microcontroller generates additional instructions to rotate the user device toward the first direction and away from the second direction. These instructions cause, based on the additional instructions generated by the microcontroller, the one or more motors of the rotary stage device to rotate the user device toward the first direction (e.g., so that the user device is positioned to have an improved/increased signal strength and/or quality relative to the other positions represented in the signal data and evaluated by the algorithm). In this manner, the method 400 may be iteratively repeated, for example, until a subsequently measured signal strength meets a predefined target throughput. The microcontroller may compare the algorithm data to the predefined target throughput and determine when the signal strength of a particular position meets a predefined target throughput.

In such iterative embodiments, subsequent to causing the one or more motors of the rotary stage device to rotate the user device toward the first direction, a third signal strength is measured when the user device has been rotated toward the first direction. The motors of the rotary stage device then rotate the user device toward a third direction and a fourth signal strength is measured when the user device has been rotated toward the third direction. The gradient ascent algorithm determines that the fourth signal strength is greater than the third signal strength, in this example. Based on the determination output by the gradient ascent algorithm, the microcontroller generates subsequent instructions to rotate the user device toward the third direction and away from the first direction. Based on the subsequent instructions generated by the microcontroller, the one or more motors of the rotary stage device rotate the user device toward the third direction as corresponding to improved signal strength and/or quality. In this manner, the method rotates and measures, again and again in cycles, until the signal strength of a particular position is determined to meet the predefined target throughput.

Figure 5:
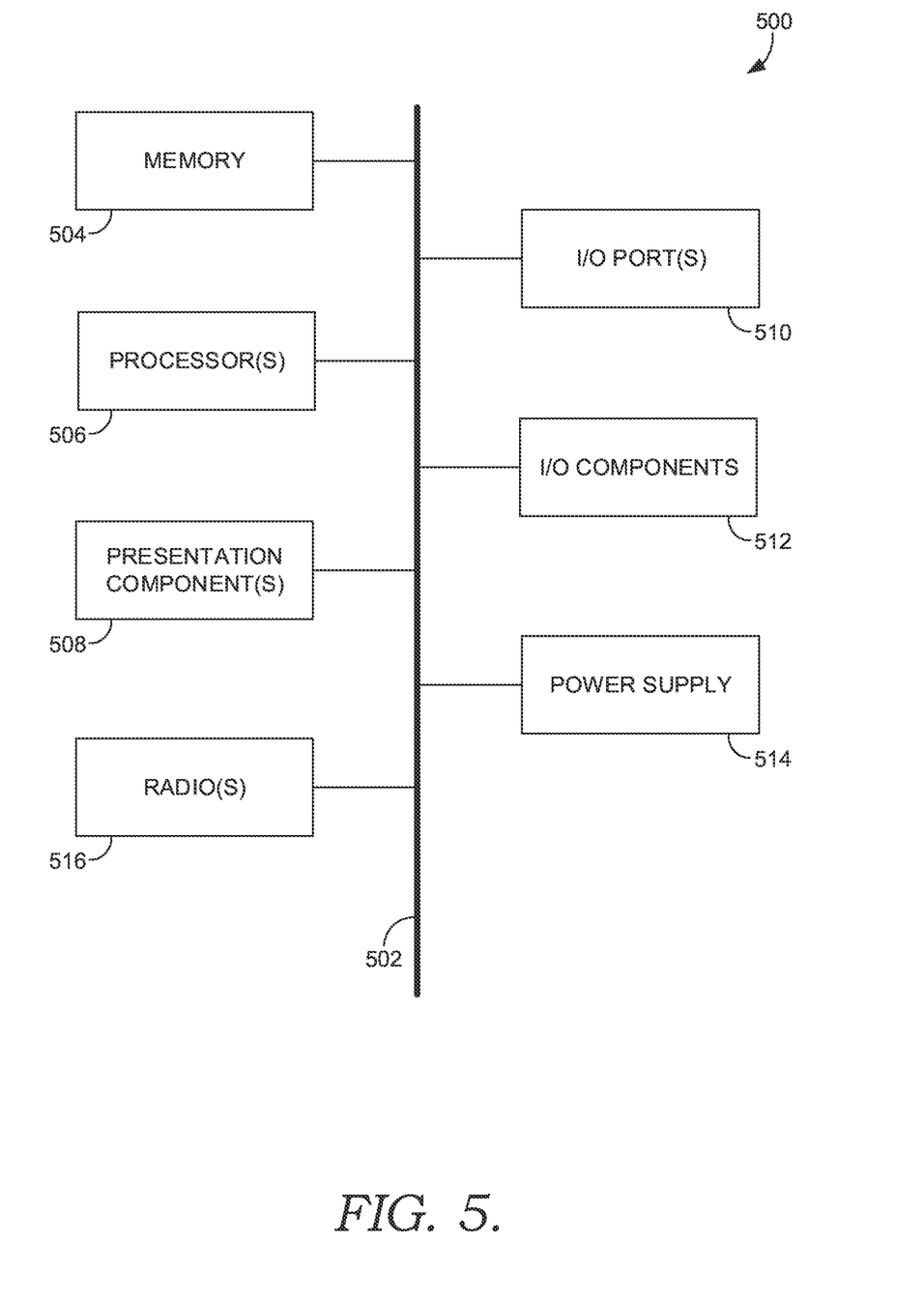
FIG. 5 illustrates an example computing device suitable for use in implementations of the present disclosure.

Turning now to FIG. 5, a diagram is depicted of an example computing device 500 suitable for use in implementations of the present disclosure. Computing device 500 is but one example of a suitable computing environment and is not intended to suggest any limitation as to the scope of use or functionality of the invention. Neither should computing device 500 be interpreted as having any dependency or requirement relating to any one or combination of components illustrated.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 5, computing device 500 includes bus 502 that directly or indirectly couples the following devices: memory 504, one or more processors 506, one or more presentation components 508, input/output (I/O) ports 510, I/O components 512, and power supply 514. Bus 502 represents what may be one or more busses (such as an address bus, data bus, or combination thereof). Although the devices of FIG. 5 are shown with lines for the sake of clarity, in reality, delineating various components is not so clear, and metaphorically, the lines would more accurately be grey and fuzzy. For example, one may consider a presentation component such as a display device to be one of the I/O components 512. Also, processors, such as one or more processors 506, have memory. Distinction is not made between such categories as "workstation," "server," "laptop," "handheld device," etc., as all are contemplated within the scope of FIG. 5 and refer to "computer" or "computing device."

Computing device 500 typically includes a variety of computer-readable media. Computer-readable media can be any available media that can be accessed by computing device 500 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 504 includes computer-storage media in the form of volatile and/or nonvolatile memory. Memory 504 may be removable, non-removable, or a combination thereof. Examples of memory include solid-state memory, hard drives, optical-disc drives, etc. Computing device 500 includes one or more processors 506 that read data from various entities such as bus 502, memory 504 or I/O components 512. One or more presentation components 508 present data indications to a person or other device. Examples of one or more presentation components 508 include a display device, speaker, printing component, vibrating component, etc. I/O ports 510 allow computing device 500 to be logically coupled to other devices, including I/O components 512, some of which may be built in computing device 500. Examples of I/O components 512 include a microphone, joystick, game pad, satellite dish, scanner, printer, wireless device, etc.

Radio 516 represents a radio that facilitates communication with a wireless telecommunication network. Illustrative wireless telecommunications technologies include CDMA, GPRS, TDMA, GSM, and the like. Radio 516 might additionally or alternatively facilitate other types of wireless communications including Wi-Fi, WiMAX, LTE, or other VoIP communications. As can be appreciated, in various embodiments, radio 516 can be configured to support multiple technologies and/or multiple radios can be utilized to support multiple technologies. A wireless telecommunication network might include an array of devices, which are not shown so as to not obscure more relevant aspects of the invention. Components such as a base station, a communications tower, or even access points (as well as other components) can provide wireless connectivity in some embodiments.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

What is claimed is:

1. A system comprising:
   a radio frequency shielded structure forming an interior volume and having a RF-shielding material forming a layer at least partially surrounding the interior volume;
   a rotary stage device having one or more motors and configured to hold and manipulate a user device in three dimensions into two or more positions for each cycle in a plurality of cycles, the rotary stage device located in the interior volume of the radio frequency shielded structure;
   an antenna that transmits radio frequencies for receipt, for each cycle in a plurality of cycles, by the user device held by the rotary stage device in the interior volume of the radio frequency shielded structure;
   a computing device that receives, for each cycle in a plurality of cycles, signal data electronically output from the user device corresponding to two or more positions, the user device held by the rotary stage device located in the interior volume; and
   a microcontroller that receives, for each cycle in the plurality of cycles, algorithm data electronically output from the computing device using the signal data for the corresponding cycle, and that generates instructions for each cycle to cause the one or more motors of the rotary stage device to manipulate the user device in three dimensions toward a particular position that has a greater signal strength relative to a remainder of the two or more positions for the corresponding cycle.

2. The system of claim 1, wherein the microcontroller executes a gradient ascent algorithm against the signal data received from the computing device in near real-time.

3. The system of claim 2, wherein the microcontroller device utilizes the algorithm data to generate the instructions that cause the one or more motors of the rotary stage device to manipulate the user device in three dimensions.

4. The system of claim 2, wherein a gradient ascent algorithm compares signal receipt measurements of the user device in the signal data, the signal receipt measurements corresponding to measurements obtained when the user device receives radio frequencies transmitted from the antenna while the user device is held in each of the two or more positions by the rotary stage device in each cycle.

5. The system of claim 2, wherein, in one cycle, the algorithm data is output by the gradient ascent algorithm and indicates that a signal strength of the user device when in a first position of the two or more positions is greater than a signal strength when the user device is in a second position of the plurality of positions.

6. The system of claim 5, wherein, in the one cycle, the microcontroller determines, based on the algorithm data, to generate and communicate a first set of instructions that cause the rotary stage device to rotate the user device by a first defined quantity of degrees in a first direction relative to a first axis.

7. The system of claim 6, wherein, in the one cycle, additional algorithm data is output by the gradient ascent algorithm and indicates that a signal strength of the user device when in a third position of the plurality of positions is greater than a signal strength when the user device is in a fourth position of the plurality of positions.

8. The system of claim 7, wherein, in the one cycle, the microcontroller determines, based on the additional algorithm data, to generate and communicate a second set of instructions that cause the rotary stage device to rotate the user device by a second defined quantity of degrees in a second direction relative to a second axis.

9. A computerized method comprising:
a cycle that comprises:
receiving signal data that is associated with a plurality of positions of a user device, the signal data being electronically output from a user device held by a rotary stage device located in an interior volume of a radio frequency shielded structure;
executing a gradient ascent algorithm against the signal data to output a comparison of the signal data received for each of the plurality of positions of the user device;
determining, by a microcontroller and based on the comparison output by the gradient ascent algorithm, relative signal quality between two or more positions of the plurality of positions of the user device; and
generating and communicating, by the microcontroller, instructions for causing the rotary stage device to rotate the user device toward one position having a greater signal quality relative to signal quality of the two or more positions in the cycle,
wherein the method is iteratively repeated for a plurality of cycles.

10. The computerized method of claim 9, further comprising:
causing one or more motors of the rotary stage device to rotate the user device toward a first direction; and
measuring a first signal strength when the user device has been rotated toward the first direction.

11. The computerized method of claim 10, further comprising:
causing the one or more motors of the rotary stage device to rotate the user device toward a second direction; and
measuring a second signal strength when the user device has been rotated toward the second direction.

12. The computerized method of claim 11, further comprising:
determining, by the gradient ascent algorithm, that the first signal strength is greater than the second signal strength.

13. The computerized method of claim 12, further comprising:
determining, by the microcontroller and based on the determination output by the gradient ascent algorithm, to generate additional instructions to rotate the user device toward the first direction and away from the second direction.

14. The computerized method of claim 13, further comprising:
causing, based on the additional instructions generated by the microcontroller, the one or more motors of the rotary stage device to rotate the user device toward the first direction.

15. The computerized method of claim 14, further comprising, subsequent to causing the one or more motors of the rotary stage device to rotate the user device toward the first direction, performing another cycle of:
measuring a third signal strength when the user device has been rotated toward the first direction;
causing the one or more motors of the rotary stage device to rotate the user device toward a third direction;
measuring a fourth signal strength when the user device has been rotated toward the third direction;
determining, by the gradient ascent algorithm, that the fourth signal strength is greater than the third signal strength;
determining, by the microcontroller and based on the determination output by the gradient ascent algorithm, to generate subsequent instructions to rotate the user device toward the third direction and away from the first direction; and
causing, based on the subsequent instructions generated by the microcontroller, the one or more motors of the rotary stage device to rotate the user device toward the third direction.

16. The computerized method of claim 9, wherein the method is iteratively repeated until a subsequently measured signal strength meets a predefined target throughput.

17. One or more non-transitory computer-readable media storing instructions that, when executed via one or more processors, perform a computerized method, the media comprising:
via one or more processors, without user intervention, performing a cycle that comprises:
receiving signal data that is associated with a plurality of positions of a user device, the signal data being electronically output from a user device held by a rotary stage device located in an interior volume of a radio frequency shielded structure;
executing a gradient ascent algorithm against the signal data to output a comparison of the signal data received for each of the plurality of positions of the user device;
determining, by a microcontroller and based on the comparison output by the gradient ascent algorithm, relative signal quality between two or more of the plurality of positions of the user device; and
generating and communicating, by the microcontroller, instructions for causing the rotary stage device to rotate the user device toward one position having a greater signal quality relative to signal quality of the two or more positions in the cycle,
wherein the method is iteratively repeated for a plurality of cycles.

18. The media of claim 17, further comprising via the one or more processors and without user intervention:
causing one or more motors of the rotary stage device to rotate the user device toward a first direction; and
measuring a first signal strength when the user device has been rotated toward the first direction.

19. The media of claim 17, further comprising via the one or more processors and without user intervention:
causing the one or more motors of the rotary stage device to rotate the user device toward a second direction; and
measuring a second signal strength when the user device has been rotated toward the second direction.

20. The media of claim 17, further comprising via the one or more processors and without user intervention:
wherein when the subsequently-measured signal strength meets the predefined target throughput based on repetition of the cycle, communicating an optimization notification to the computing device and holding the user equipment in a final position.

\* \* \* \* \*